US010885454B2

(12) United States Patent
Bianchi et al.

(10) Patent No.: US 10,885,454 B2
(45) Date of Patent: Jan. 5, 2021

(54) NOVELTY DETECTION OF IOT TEMPERATURE AND HUMIDITY SENSORS USING MARKOV CHAINS

(71) Applicant: International Business Machines Corporation, Armonk, NY (US)

(72) Inventors: Thiago Bianchi, Sao Carlos (BR); Ana Paula Brambila, Sao Paulo (BR); Joao Souto Maior, Jaboatao dos Guararapes (BR); John Donald Vasquez, Munich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/357,905

(22) Filed: Mar. 19, 2019

(65) Prior Publication Data

US 2020/0301385 A1 Sep. 24, 2020

(51) Int. Cl.
*G06N 7/00* (2006.01)
*G05B 19/042* (2006.01)

(52) U.S. Cl.
CPC ........... *G06N 7/005* (2013.01); *G05B 19/042* (2013.01); *G05B 2219/2614* (2013.01)

(58) Field of Classification Search
None
See application file for complete search history.

(56) References Cited

U.S. PATENT DOCUMENTS

| 9,251,472 | B1 | 2/2016 | Linowes et al. |
| 10,012,406 | B2 | 7/2018 | Kim |
| 10,475,468 | B1* | 11/2019 | Yelchuru ............ G05B 23/0262 |
| 2012/0072029 | A1 | 3/2012 | Persaud et al. |
| 2013/0226501 | A1 | 8/2013 | Ghosh |
| 2015/0330652 | A1 | 11/2015 | Kim |
| 2017/0004405 | A1* | 1/2017 | Skoglund ................ G06F 30/00 |
| 2017/0236064 | A1* | 8/2017 | Kirschnick ............ G06Q 10/06 702/35 |
| 2017/0315855 | A1* | 11/2017 | Doblander .......... G06F 11/0736 |
| 2019/0108330 | A1* | 4/2019 | Sikder ................... G06F 21/577 |

OTHER PUBLICATIONS

Andreas Klappenecker, "Markov Chains", 2018, Texas A&M University, pp. 1-29, (Year: 2018).*

(Continued)

*Primary Examiner* — Santosh R Poudel
(74) *Attorney, Agent, or Firm* — Yee & Associates, P.C.

(57) ABSTRACT

Monitoring indoor environmental conditions is provided. Sensor data and its corresponding time stamps from is collect from a number of environmental sensors within an enclosed environment. A set of all possible states is defined for a specified time period, each state representing a range of sensor data values. A probability of the system changing from any one state to another is modeled according to a Markov chain. When a new sensor data value is received from a sensor it is compared to a last sensor data value of a previous state, and a probability of transition from the previous state to the current state is determined. If the probability of transition from the previous state to the current state is less than a predetermined threshold, an anomaly is detected, and a service request is generated.

16 Claims, 6 Drawing Sheets

(56) References Cited

OTHER PUBLICATIONS

Qian Jiang, Construction of Transition Matrices of Reversible Markov Chains, 2009, pp. 13-22 (Year: 2009).*

Evans et al. "Probability and Statistics", 2009, University of Toronto, Second Edition, pp. 624-632. (Year: 2009).*

Paschalidis et al., "Anomaly Detection in Sensor Networks based on Large Deviations of Markov Chain Models", 47th IEEE Conference on Decision and Control, Cancun, Mexico, Dec. 2008, 6 pages.

Gornitz et al., "Hidden Markov Anomaly Detection," Proceedings of the 32nd International Conference on Machine Learning, Lille France, 2015, vol. 37, pp. 2338-2343.

Haque et al., "Markov Chain Modeling for Anomaly Detection in High Performance Computing System Logs," Association for Computing Machinery, Denver Colorado, Nov. 2017, 8 pages.

Raghavan et al., "Quickest Change Detection of a Markov Process Across a Sensor Array," IEEE Transactions on Information Theory, vol. 56, No. 4, Apr. 2010, pp. 1961-1981.

* cited by examiner

US 10,885,454 B2

NOVELTY DETECTION OF IOT TEMPERATURE AND HUMIDITY SENSORS USING MARKOV CHAINS

BACKGROUND

The disclosure relates generally to environmental control within a building and more specifically to detecting and anticipating disturbances in environmental comfort levels based on input from distributed sensors throughout the building.

The management of buildings, particularly commercial spaces like offices, poses a challenge for maintaining comfort levels of occupants while optimizing energy usage for heating and air conditioning to minimize waste. Temperature and humidity levels are examples of environmental attributes critical to maintaining comfort levels. Several factors can affect and change the environmental conditions (i.e. temperature/humidity) within a building. Some of these factors might be expected and stable changes such as changes in seasons or increased building occupancy. However, other factors distributing environmental conditions and comfort level can be less predictable such as opened windows or doors, a sudden increase in the number of people in a single room, HVAC malfunction, the concurrent use of multiple devices and machines within the same space, etc. Identifying these kinds of occurrences poses a significant challenge.

With the expansion of the Internet of Things (IoT), interconnected microelectromechanical systems (MEMS), known as off-the-shelf sensors, are becoming more common in day-to-day activities. The data provided by distributed sensors can be applied to many uses from energy management to space utilization, maintenance, security, and safety.

SUMMARY

An illustrative embodiment provides a computer-implemented method for monitoring indoor environmental conditions. The method comprising receiving sensor data and its corresponding time stamps from a number of environmental sensors within an enclosed environment. Using the sensor data, a set of all possible states of a system representing the enclosed environment is defined for a specified time period, wherein each state represents a range of sensor data values. A probability of the system changing from any one state to another is modeled according to a Markov chain, wherein the Markov chain uses a predetermined number of historic sensor data values over the specified time period. When a new sensor data value is received from one of the environmental sensors it is compared to a last sensor data value of a previous state, and a probability of transition from the previous state to the current state is determined. If the probability of transition from the previous state to the current state is less than a predetermined threshold, an anomaly is identified, and a service request is generated.

Another illustrative embodiment provides a system for monitoring indoor environmental conditions. The system comprises a bus system, a storage device connected to the bus system, wherein the storage device stores program instructions, and a number of processors connected to the bus system, wherein the number of processors execute the program instructions to: receive sensor data and its corresponding time stamps from a number of environmental sensors within an enclosed environment; define, according to the sensor data, a set of all possible states of a system representing the enclosed environment for a specified time period, wherein each state represents a range of sensor data values; model, according to a Markov chain, a probability of the system changing from any one state to another, wherein the Markov chain uses a predetermined number of historic sensor data values over the specified time period; receive a new sensor data value from one of the environmental sensors; compare the new sensor data value of a current state to a last sensor data value of a previous state and determining a probability of transition from the previous state to the current state; determine if the probability of transition from the previous state to the current state is equal or greater than a predetermined threshold; identify the new sensor data value as an anomaly if the probability of transition is less than the predetermined threshold; and generate a service request in response to identifying the anomaly.

Another illustrative embodiment provides a computer program product for monitoring indoor environmental conditions. The computer program product comprises a non-volatile computer readable storage medium having program instructions embodied therewith, the program instructions executable by a number of processors to cause the computer to perform the steps of: receiving sensor data and its corresponding time stamps from a number of environmental sensors within an enclosed environment; defining, according to the sensor data, a set of all possible states of a system representing the enclosed environment for a specified time period, wherein each state represents a range of sensor data values; modeling, according to a Markov chain, a probability of the system changing from any one state to another, wherein the Markov chain uses a predetermined number of historic sensor data values over the specified time period; receiving a new sensor data value from one of the environmental sensors; comparing the new sensor data value of a current state to a last sensor data value of a previous state and determining a probability of transition from the previous state to the current state; determining if the probability of transition from the previous state to the current state is equal to or greater than a predetermined threshold; identifying the new sensor data value as an anomaly if the probability of transition is less than the predetermined threshold; and generating a service request in response to identifying the anomaly.

DETAILED DESCRIPTION

Figure 1:
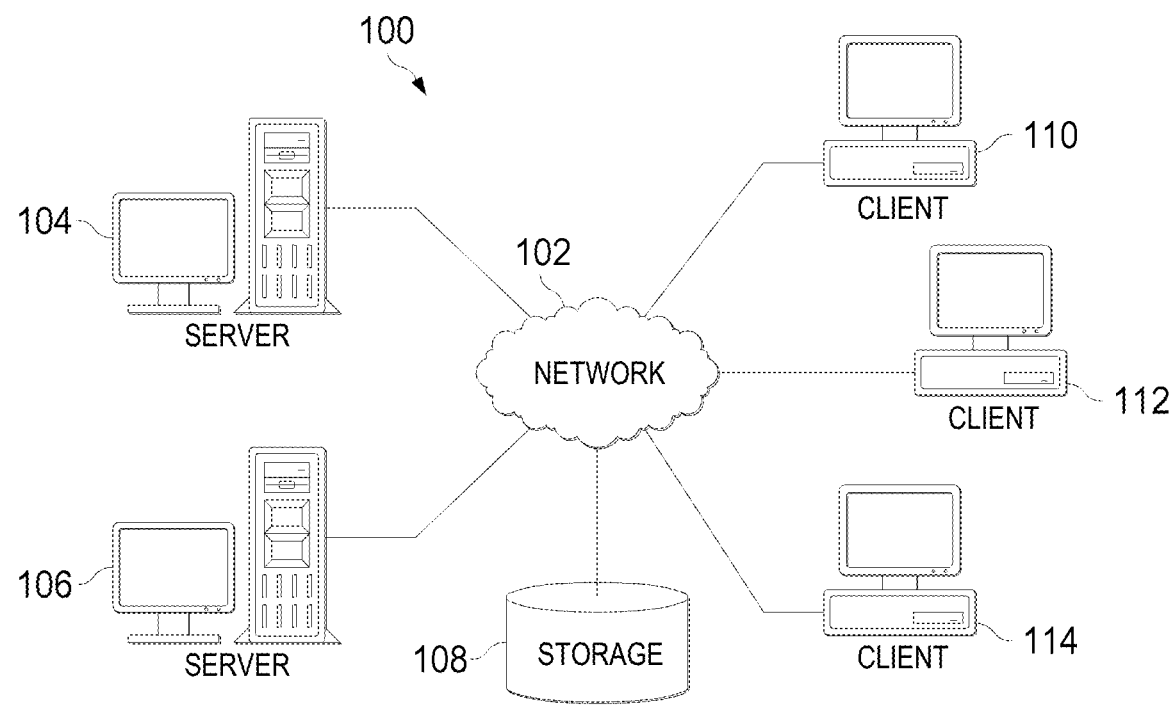
FIG. 1 depicts a pictorial representation of a network of data processing systems in which illustrative embodiments can be implemented.

Embodiments recognize and take into account that the management of office buildings facilities is a challenge since it needs to provide comfort to the users without wasting excessive energy of heaters and air conditioner systems. The temperature and humidity levels are an example of attributes that need to be maintained for occupant comfort levels.

Embodiments also recognize and take into account that in an office building with many employees there are several potential sources of events that can disturb temperature and humidity, such as opened windows, too many people in the same room, multiple of devices turned on concurrently, failure on HVAC systems, etc. Illustrative embodiments provide the ability to predict when this kind of occurrences happen.

Embodiments also recognize and take into account that with the expansion of the Internet of Things there is a new era of modern microprocessors capable of generating data. This high demand will be responsible for the emergence of new Off-The-Shelf sensors. Using IoT Off-the-Shelf sensors, so-called Smart buildings can have a big impact, from energy management to space utilization and optimization, building equipment and maintenance, security, and safety. Illustrative embodiments allow a building to help itself, facilities managers, and occupants by taking proactive steps to prevent downtime and reduce costs of environmental control and improve sustainability.

Embodiments also recognize and take into account that a Smart building that has multiple floors and different rooms in each floor faces a challenge on daily basis to provide a comfortable workplace and at the same time be able to better use and manage their assets. Environmental factors such as temperature, lighting, humidity and ventilation can have a direct impact on health. For example, high temperatures can lead to heat stress and heat exhaustion. To overcome these challenges, illustrative embodiments can monitor and manage environmental conditions for each individual room within a building.

The illustrative embodiments provide a method for using Markov Chain as a tool for detecting unexpected novelties in IoT sensor data for humidity and temperature, making it possible to monitor the data stream in real time and identify scenarios where changes in the pattern of humidity and temperature data occurs. By utilizing Markov chains, the method works without the need to specify upper and lower limits for the data since it only monitors the state transition probability.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

FIG. 1 depicts a pictorial representation of a network of data processing systems in which illustrative embodiments can be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more connector services for managing idempotent operations on a system of record, such as storage 108. An idempotent operation is an identical operation, which was previously performed or executed, that has the same effect as performing a single operation. Also, it should be noted that server 104 and server 106 may each represent a plurality of servers providing management of idempotent operations for a plurality of system of records.

Client 110, client 112, and client 114 also connect to network 102. Clients 110, 112, and 114 are clients of server 104 and server 106. Server 104 and server 106 may provide information, such as boot files, operating system images, and software applications to clients 110, 112, and 114.

In this example, clients 110, 112, and 114 are shown as desktop or personal computers. However, it should be noted that clients 110, 112, and 114 are intended as examples only. In other words, clients 110, 112, and 114 may include other types of data processing systems, such as, for example, network computers, laptop computers, tablet computers, handheld computers, smart phones, smart watches, personal digital assistants, gaming devices, set-top boxes, kiosks, and the like. Users of clients 110, 112, and 114 may utilize clients 110, 112, and 114 to access system of records corresponding to one or more enterprises, via the connector services provided by server 104 and server 106, to perform different data operations. The operations may be, for example, retrieve data, update data, delete data, store data, and the like, on the system of records.

Storage 108 is a network storage device capable of storing any type of data in a structured format or an unstructured format. In addition, storage 108 may represent a plurality of network storage devices. Further, storage 108 may represent a system of record, which is an authoritative data source, corresponding to an enterprise, organization, institution, agency, or similar entity. Furthermore, storage unit 108 may store other types of data, such as authentication or credential data that may include user names, passwords, and biometric data associated with client users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
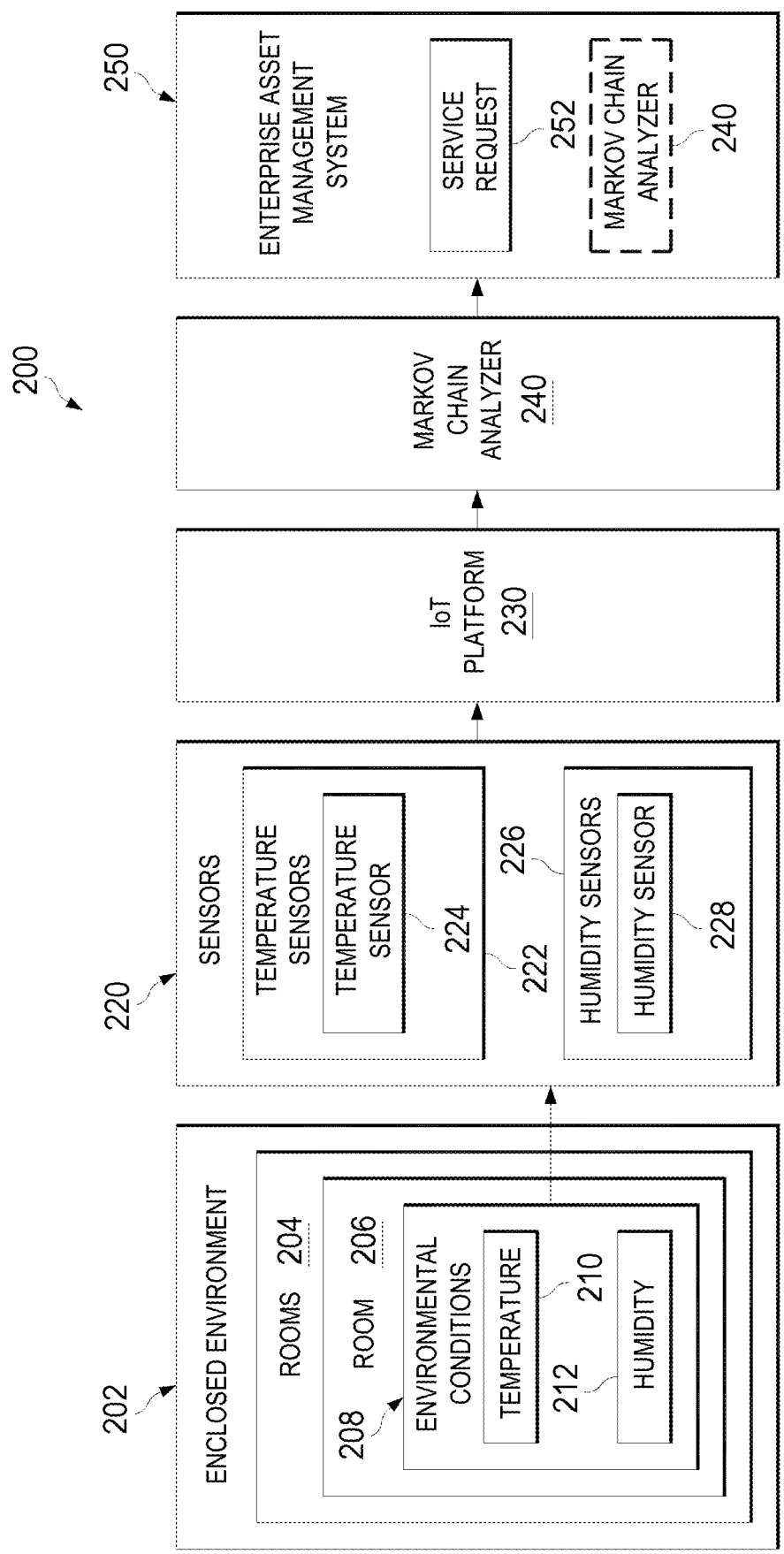
FIG. 2 illustrates a block diagram of system for monitoring indoor environmental conditions in accordance with an illustrative embodiment.

FIG. 2 illustrates a block diagram of a system for monitoring indoor environmental conditions in accordance with an illustrative embodiment. System 200 encompasses enclosed environment 202, which can be, for example, an office building, store, hospital, or other similar structure. The enclosed environment 202 can comprise multiple rooms 204. Each room 206 will have its own environmental conditions 208.

Two of the most relevant environmental conditions affecting occupant comfort are temperature 210 and humidity 212. It should be emphasized that other environmental conditions can be accounted for within the scope of the present disclosure and illustrative embodiments. The temperature 210 and humidity 212 within a room 206 can vary for a plurality of reasons, such sunlight exposure, number of occupants, foot traffic, open windows, doors to the outside, devices and other equipment operating within the room, variations in air circulation from an HVAC system, etc.

A plurality of sensors 220 can be distributed throughout the enclosed environment 202. As noted above, the types of environmental conditions monitored by the sensors 220 can be many in number, but for ease of explanation, the illustrative embodiments focus on temperature sensors 222 and humidity sensors 228. Each room 208 can have a single temperature sensor 224 and humidity sensor 228 or multiple such sensors, depending on the size of the room and number of impacting factors present.

Environmental sensor data values are collected by an Internet of Things (IoT) platform 230 and fed to a Markov chain analyzer 240 (discussed in detail below). IoT Platform 230 provides capabilities including device registration, connectivity, security, control, rapid visualization, and storage of data derived from the IoT devices.

The results of the Markov chain analysis are fed to an enterprise asset management system 250. If the analysis indicates a novelty (an unlikely variation in temperature and/or humidity), it generates a service request 252 with the asset management system 250. The service request 252 might result in a physical inspection by service personnel or an adjustment in environmental controls for temperature, humidity, ventilation, and/or lighting to compensate for the sudden, unexpected change in temperature and humidity.

For example, the temperature in a room might be 22° C. during a specified time interval with small variations of plus or minus 2° C. Temperature data provided by sensors is fed into the IoT platform. A client application associated with the asset management system subscribes to the IoT platform to receive the sensor data. If the temperature in the room suddenly changes to 14° C. the Markov chain detects a novelty, and a service request is created in the asset management system. A field technician can be sent to find root cause of the temperature, which might be as simple as an open window or more complicated like an HVAC failure.

As illustrated in FIG. 2, the Markov analyzer 240 can be an add-on to a preexisting asset management system 250, or alternatively it can be incorporated directly into the asset management system 250.

Figure 3:
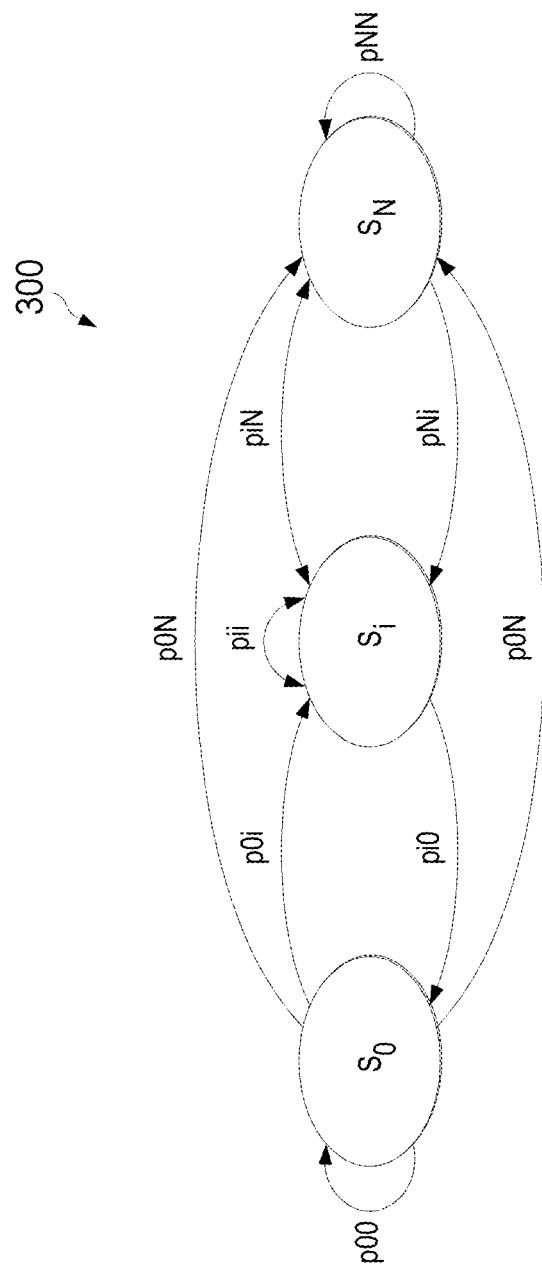
FIG. 3 illustrates a Markov chain in accordance with illustrative embodiments.

FIG. 3 illustrates a Markov chain in accordance with illustrative embodiments. In probability theory a Markov process is a stochastic (randomly determined) process that satisfies the condition wherein predictions about the future of the process can be based solely on its present state just as well as if the full history of the process were known. A Markov chain is a model describing a sequence of possible events in which the probability of each event depends only on the state attained in the previous event.

In illustrative embodiments, the environmental sensors send temperature and humidity readings with corresponding time stamps when the readings have occurred. Considering a room as a system, the temperature and humidity within the room varies within a range, wherein:

$R_{min}$: lower reading of the system defined as a parameter
$R_{max}$: higher reading of the system defined as a parameter Markov chain can be used to model the changes in this system by defining its states and calculating the probability of going from one state to another. In Markov chain 300 each state $S_i$ represents a range of reading values, wherein:

$\Delta r$: an arbitrary resolution of the system defined as a parameter
N: size of the chain, where eq $$N = \frac{R_{max} - R_{min}}{\Delta r}$$

Si: generic state defined by a range of values
The initial state $S_0$ is given by:

$$S_0 = R_{min} \rightarrow R_{min} + \Delta r$$

Figure 6:
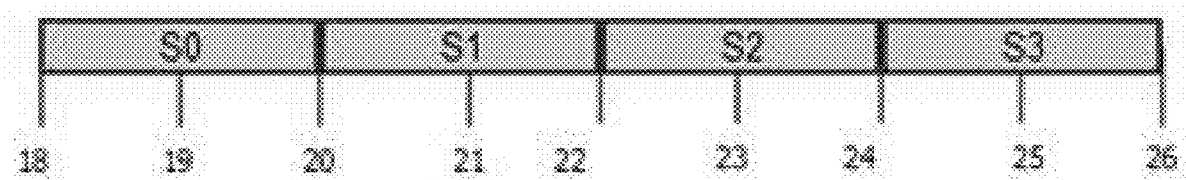
FIG. 6 illustrates the states of a temperature system.

For example, given a temperature system where $R_{min}=18°$ C., $R_{max}=26°$ C., and $\Delta r=2°$ C., the states $S_0, S_1, \ldots S_N$ can be defined as illustrated in FIG. 6.

$p_{ij}$: probability to go from state $S_i$ to state $S_j$.

The transition matrix $S_{ij}$ represented below is used to count each new transition of state. As soon as a reading r(t) is inputted, it is analyzed and checked against the previous reading. For example, if r(t) belongs to state $S_2$ and the last reading r(t-1) belongs to state $S_1$, then the matrix $S_{ij}$ will increment element $S_{12}$ by 1.

$$S_{ij} = \begin{bmatrix} S_{11} & S_{12} & \ldots & S_{1N} \\ S_{21} & S_{22} & \ldots & S_{2N} \\ \vdots & \vdots & \vdots & \vdots \\ S_{N1} & S_{N2} & \ldots & S_{NN} \end{bmatrix} \text{Transition Matrix}$$

Next, the transition matrix is used to calculate the state transition probability. For each element of matric Sij, the probability pij can be written as:

$$p_{ij} = \frac{s_{ij}}{\sum_{j=0}^{N} s_{ij}}$$

Once each state transition probability is calculated, the probability transition matrix can be written as:

$$P_{ij} = \begin{bmatrix} p_{11} & p_{12} & \ldots & p_{1N} \\ p_{21} & p_{22} & \ldots & p_{2N} \\ \vdots & \vdots & \vdots & \vdots \\ p_{N1} & p_{N2} & \ldots & p_{NN} \end{bmatrix} \text{Probability Transition Matrix}$$

If, for a given transition of states i→j the state transition probability $p_{ij}$ is considered to be low as compared to a predefined threshold, a novelty in readings can be inferred since an event of low probability, or something considered unusual to the system, has happened.

Figure 4:
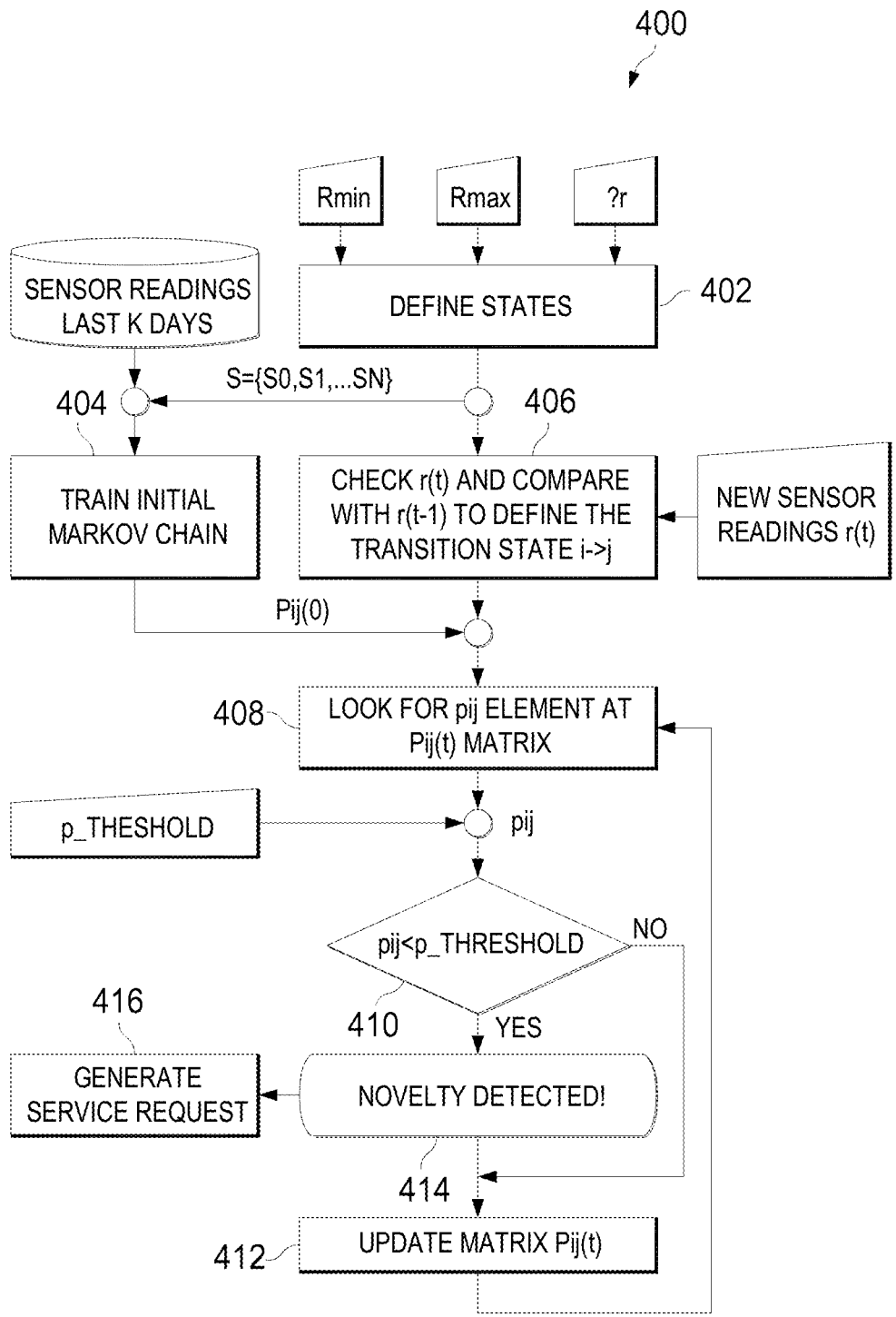
FIG. 4 illustrates a process flow for building a probability matrix and detecting novelty in sensor data in accordance with illustrative embodiments.

FIG. 4 illustrates a process flow for building a probability matrix and detecting novelty in sensor data in accordance with illustrative embodiments. Process 400 begins by defining the states (step 402). Considering the minimal reading $R_{min}$, the maximum reading $R_{max}$ and the resolution $\Delta r$, the algorithm is able to define the set of all the possible states $S_0$, $S_1$, ... $S_N$.

The readings from the last K days are used to train the initial Markov chain and populate the matrix $S_{ij}(0)$ that is used to calculate the initial probability transition matrix $P_{ij}(0)$ (step 404). Each new reading r(t) is checked against the last reading r(t−1), and the transition 1→j (from previous state i to the current state j) can be defined (step 406).

After defining the transition i→j, the probability $p_{ij}$ is obtained from the $P_{ij}$ matrix (step 408) and compared against threshold parameter (step 410). If $p_{ij}$ is equal to or greater than threshold value $p_{threshold}$ it indicates that temperature and humidity are within an expected probable range, and the state transition probability matrix $P_{ij}$ is updated with the reading r(t) (step 412).

However, if $p_{ij}$ is lower than $p_{threshold}$, it means a rare event has happened. The reading r(t) corresponds to an event with a low probability of happening and is therefore anomalous. In this case a novelty is detected (step 414) before the state transition probability matrix is updated.

In response to detection of a novelty a service request is generated in the enterprise management system (step 416).

The illustrative embodiments work on a real time basis to detect changes in temperature and humidity. This method works without the need to specify upper and lower limits for the data since it only monitors the state probability transition.

Figure 5:
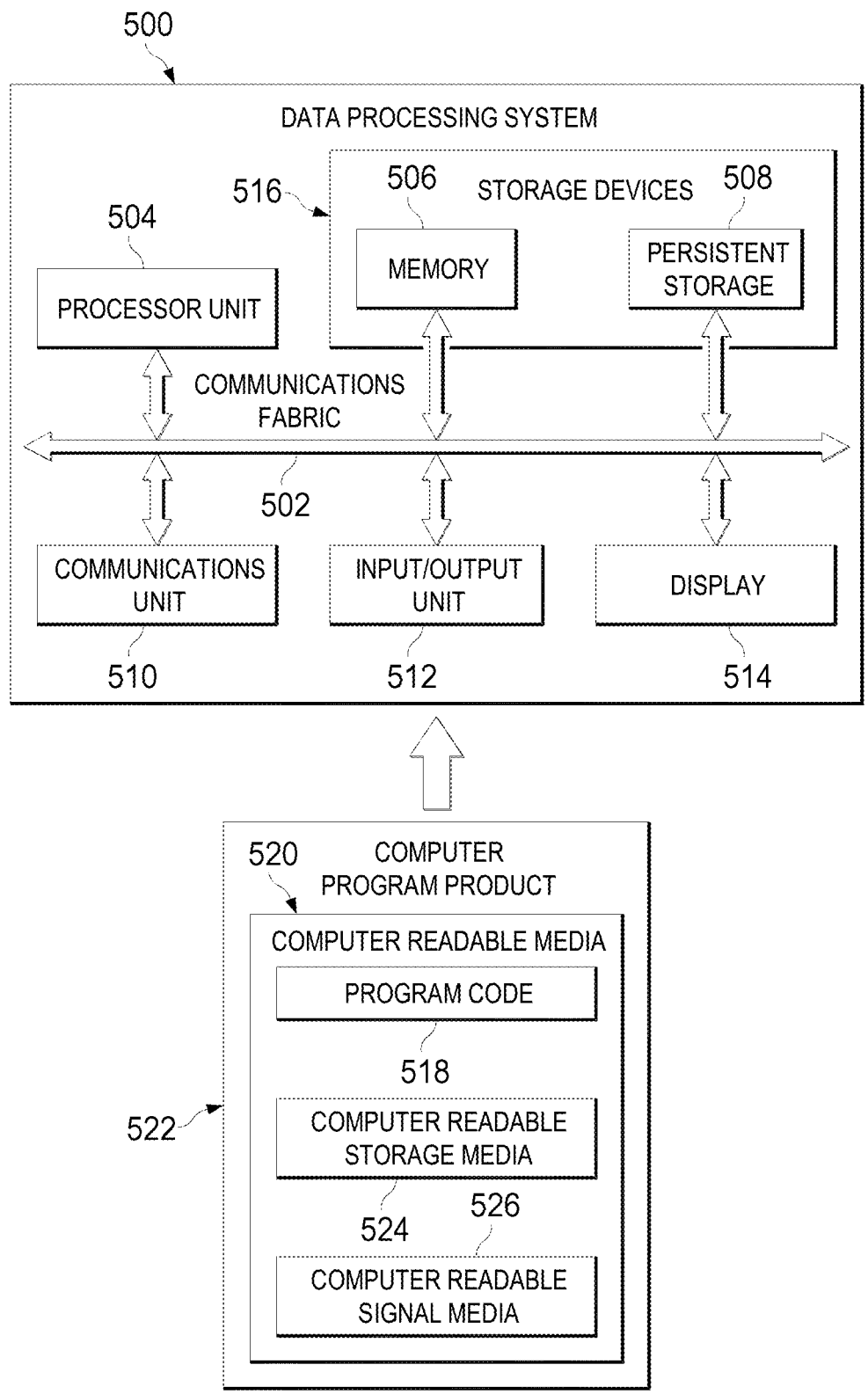
FIG. 5 is a diagram of a data processing system is depicted in accordance with an illustrative embodiment.

Turning to FIG. 5, a diagram of a data processing system is depicted in accordance with an illustrative embodiment. Data processing system 500 is an example of a system in which computer-readable program code or program instructions implementing processes of illustrative embodiments may be run. Data processing system 500 may be an example of one system in which a root cause analysis system may be implemented. In this illustrative example, data processing system 500 includes communications fabric 502, which provides communications between processor unit 504, memory 506, persistent storage 508, communications unit 510, input/output unit 512, and display 514.

Processor unit 504 serves to execute instructions for software applications and programs that may be loaded into memory 506. Processor unit 504 may be a set of one or more hardware processor devices or may be a multi-processor core, depending on the particular implementation. Further, processor unit 504 may be implemented using one or more heterogeneous processor systems, in which a main processor is present with secondary processors on a single chip. As another illustrative example, processor unit 504 may be a symmetric multi-processor system containing multiple processors of the same type.

A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 506, in these examples, may be, for example, a random access memory, or any other suitable volatile or non-volatile storage device. Persistent storage 508 may take various forms, depending on the particular implementation. For example, persistent storage 508 may contain one or more devices. For example, persistent storage 508 may be a hard drive, a flash memory, a rewritable optical disk, a rewritable magnetic tape, or some combination of the above. The media used by persistent storage 508 may be removable. For example, a removable hard drive may be used for persistent storage 508.

Communications unit 510, in this example, provides for communication with other computers, data processing systems, and devices via network communications unit 510 may provide communications using both physical and wireless communications links. The physical communications link may utilize, for example, a wire, cable, universal serial bus, or any other physical technology to establish a physical communications link for data processing system 500. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 500.

Input/output unit 512 allows for the input and output of data with other devices that may be connected to data processing system 500. For example, input/output unit 512 may provide a connection for user input through a keypad, keyboard, and/or some other suitable input device. Display 514 provides a mechanism to display information to a user and may include touch screen capabilities to allow the user to make on-screen selections through user interfaces or input data, for example.

Instructions for the operating system, applications, and/or programs may be located in storage devices 516, which are in communication with processor unit 504 through communications fabric 502. In this illustrative example, the instructions are in a functional form on persistent storage 508. These instructions may be loaded into memory 506 for running by processor unit 504. The processes of the different embodiments may be performed by processor unit 504 using computer-implemented program instructions, which may be located in a memory, such as memory 506. These program instructions are referred to as program code, computer-usable program code, or computer-readable program code that may be read and run by a processor in processor unit 504. The program code, in the different embodiments, may be embodied on different physical computer-readable storage devices, such as memory 506 or persistent storage 508.

Program code 518 is located in a functional form on computer-readable media 520 that is selectively removable and may be loaded onto or transferred to data processing system 500 for running by processor unit 504. Program code 518 and computer-readable media 520 form computer program product 522. In one example, computer-readable media 520 may be computer-readable storage media 524 or computer-readable signal media 526. Computer-readable storage media 524 may include, for example, an optical or magnetic disc that is inserted or placed into a drive or other device that is part of persistent storage 508 for transfer onto a storage device, such as a hard drive, that is part of persistent storage 508. Computer-readable storage media 524 also may take the form of a persistent storage, such as a hard drive, a thumb drive, or a flash memory that is connected to data processing system 500. In some instances, computer-readable storage media 524 may not be removable from data processing system 500.

Alternatively, program code 518 may be transferred to data processing system 500 using computer-readable signal media 526. Computer-readable signal media 526 may be, for example, a propagated data signal containing program code 518. For example, computer-readable signal media 526 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 518 may be downloaded over a network to persistent storage 508 from another device or data processing system through computer-readable signal media 526 for use within data processing system 500. For instance, program code stored in a computer-readable storage media in a data processing system may be downloaded over a network from the data processing system to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to, or in place of, those illustrated for data processing system 500. Other components shown in FIG. 5 can be varied from the illustrative examples shown. The different embodiments may be implemented using any hardware device or system capable of executing program code. As one example, data processing system 500 may include organic components integrated with inorganic components and/or may be comprised entirely of organic components excluding a human being. For example, a storage device may be comprised of an organic semiconductor.

As another example, a computer-readable storage device in data processing system 500 is any hardware apparatus that may store data. Memory 506, persistent storage 508, and computer-readable storage media 524 are examples of physical storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506 or a cache such as found in an interface and memory controller hub that may be present in communications fabric 502.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer readable program instructions to personalize the electronic circuitry, in order to perform aspects of the present invention.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Furthermore, it should be understood that embodiments discussed herein are not limited to the particular features and processing steps shown. The flowchart and diagrams in the figures illustrate the method and resulting architecture according to embodiments of the present disclosure. In this regard, each block in the flowchart or structural diagrams may represent a step or partial step, which comprise one or more procedures for implementing the illustrative embodiments. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for monitoring indoor environmental conditions, the computer-implemented method comprising:
   receiving, by a number of processors, sensor data and corresponding time stamps from a number of environmental sensors within an enclosed environment;
   determining, by the number of processors according to the sensor data, a number of states between a minimum sensor data value and a maximum sensor data value of a system representing the enclosed environment for a specified time period, wherein each state in the number of states represents a range of sensor data values;
   modeling, by the number of processors according to a Markov chain, a probability of the system changing from any one state to another state in the number of states, wherein the Markov chain uses a predetermined number of historic sensor data values over the specified time period;
   receiving, by the number of processors, a new sensor data value from one of the number of environmental sensors;
   comparing, by the number of processors, the new sensor data value of a current state to a last sensor data value of a previous state and determining a probability of transition from the previous state to the current state based on the comparing;
   determining, by the number of processors, whether the probability of transition from the previous state to the current state is less than a predetermined threshold;
   identifying, by the number of processors, the new sensor data value as an anomaly in response to the number of processors determining that the probability of transition is less than the predetermined threshold; and
   adjusting, by the number of processors, environmental controls to maintain occupant comfort levels in the enclosed environment in response to the number of processors identifying the new sensor data value as the anomaly, wherein the environmental controls include controls for temperature, humidity, lighting, and ventilation to compensate for unexpected change in temperature and humidity.

2. The computer-implemented method of claim 1, wherein the number of processors determines the number of states by dividing a difference between the maximum sensor data value and the minimum sensor data value of the system by a resolution value.

3. The computer-implemented method of claim 1, further comprising:
   populating, by the number of processors, a transition matrix initialized to count each new transition of a state;
   incrementing, by the number of processors, a respective element in the transition matrix in response to determining the transition from the previous state to the current state; and
   calculating, by the number of processors, a probability transition matrix from values of the transition matrix.

4. The computer-implemented method of claim 3, further comprising:
   updating, by the number of processors, the probability transition matrix using the new sensor data value.

5. The computer-implemented method of claim 1, wherein the sensor data comprises temperature and humidity data.

6. The computer-implemented method of claim 1, wherein the system is a room of the enclosed environment comprising a multitude of rooms.

7. A system for monitoring indoor environmental conditions, the system comprising:
   a bus system;
   a storage device connected to the bus system, wherein the storage device stores program instructions; and
   a number of processors connected to the bus system, wherein the number of processors execute the program instructions to:
   receive sensor data and corresponding time stamps from a number of environmental sensors within an enclosed environment;
   determine, according to the sensor data, a number of states between a minimum sensor data value and a maximum sensor data value of a system representing the enclosed environment for a specified time period, wherein each state in the number of states represents a range of sensor data values;
   model, according to a Markov chain, a probability of the system changing from any one state to another state in the number of states, wherein the Markov chain uses a predetermined number of historic sensor data values over the specified time period;

receive a new sensor data value from one of the number of environmental sensors;

compare the new sensor data value of a current state to a last sensor data value of a previous state and determine a probability of transition from the previous state to the current state based on comparing;

determine whether the probability of transition from the previous state to the current state is less than a predetermined threshold;

identify the new sensor data value as an anomaly in response to the number of processors determining that the probability of transition is less than the predetermined threshold; and adjust environmental controls to maintain occupant comfort levels in the enclosed environment in response to identifying the new sensor data value as the anomaly, wherein the environmental controls include controls for temperature, humidity, lighting, and ventilation to compensate for unexpected change in temperature and humidity.

8. The system of claim 7, wherein the number of states is determined by dividing a difference between the maximum sensor data value and the minimum sensor data value of the system by a resolution value.

9. The system of claim 7, wherein the number of processors further execute the program instructions to:

populate a transition matrix initialized to count each new transition of a state;

increment a respective element in the transition matrix in response to determining the transition from the previous state to the current state; and calculate a probability transition matrix from values of the transition matrix.

10. The system of claim 9, wherein the number of processors further execute the program instructions to:

update the probability transition matrix using the new sensor data value.

11. The system of claim 7, wherein the sensor data comprises temperature and humidity data.

12. A computer program product for monitoring indoor environmental conditions, the computer program product comprising a computer readable storage medium having program instructions embodied therewith, the program instructions executable by a number of processors to cause the number of processors to perform steps of:

receiving sensor data and corresponding time stamps from a number of environmental sensors within an enclosed environment;

determining, according to the sensor data, a number of states between a minimum sensor data value and a maximum sensor data value of a system representing the enclosed environment for a specified time period, wherein each state in the number of states represents a range of sensor data values;

modeling, according to a Markov chain, a probability of the system changing from any one state to another state in the number of states, wherein the Markov chain uses a predetermined number of historic sensor data values over the specified time period;

receiving a new sensor data value from one of the number of environmental sensors;

comparing the new sensor data value of a current state to a last sensor data value of a previous state and determining a probability of transition from the previous state to the current state based on the comparing;

determining whether the probability of transition from the previous state to the current state is less than a predetermined threshold;

identifying the new sensor data value as an anomaly in response to the number of processors determining that the probability of transition is less than the predetermined threshold; and adjusting environmental controls to maintain occupant comfort levels in the enclosed environment in response to identifying the new sensor data value as the anomaly, wherein the environmental controls include controls for temperature, humidity, lighting, and ventilation to compensate for unexpected change in temperature and humidity.

13. The computer program product of claim 12, wherein the number of states is determined by dividing a difference between the maximum sensor data value and the minimum sensor data value of the system by a resolution value.

14. The computer program product of claim 12, further comprising instructions for:

populating, a transition matrix initialized to count each new transition of a state;

incrementing, a respective element in the transition matrix in response to determining the transition from the previous state to the current state; and calculating, probability transition matrix from values of the transition matrix.

15. The computer program product of claim 14, further comprising instructions for:

updating the probability transition matrix using the new sensor data value.

16. The computer program product of claim 12, wherein the sensor data comprises temperature and humidity data.

* * * * *